July 19, 1966 J. I. AWEIDA ETAL 3,261,563

MAGNETIC TAPE REEL CONTROL SERVO SYSTEM

Filed Jan. 11, 1962 2 Sheets-Sheet 1

INVENTORS
JESSE I. AWEIDA
DONALD K. CLOSE
HENRY C. PAO

BY Bernard M. Goldman
ATTORNEY

MAGNETIC TAPE REEL CONTROL SERVO SYSTEM

Filed Jan. 11, 1962 2 Sheets-Sheet 2

United States Patent Office 3,261,563 Patented July 19, 1966

3,261,563
MAGNETIC TAPE REEL CONTROL SERVO SYSTEM

Jesse I. Aweida, Poughkeepsie, Donald K. Close, Wappingers Falls, and Henry C. Pao, Poughkeepsie, N.Y., assignors to International Business Machines Corporation, New York, N.Y., a corporation of New York Filed Jan. 11, 1962, Ser. No. 165,482
2 Claims. (Cl. 242—55.12)

This invention pertains to a servo system which automatically controls upper and lower "dynamic-loop" positions for a tape in a vacuum column, without switching any reference signals into the servo system as a function of tape direction.

A "dynamic" loop is a loop formed of moving tape, and is to be distinguished from a "static loop" formed of non-moving tape.

The tape loop in a tape transport buffers very fast tape starts and stops caused by a capstan, from a tape reel, which inherently is sluggishly-responding. The maximum length of the tape loop should be made as short as possible to minimize the size of a vacuum column in a tape transport. The loop length can be minimized by properly controlling its position in the column as a function of the direction of tape movement. Prior systems have basically used such loop positioning either with off-on servo systems or in a more complex manner using proportionally-controlled servo systems.

Prior patents or prior loop positioning systems require electrical signals derived from capstan control circuits to be switched into the servo system to obtain plural loop positions as a function of direction of tape motion, where proportional loop sensing is used. Such U.S. patents are No. 2,708,554 to Welsh and No. 2,952,415 to Gilson. Each of these patents utilizes a plurality of relays for switching into a servo system one of plural electrical signals to tell the servo system whether is should position a tape loop at an upper or lower position as a function of direction of tape motion. Both prior patents regulate for a zero error-voltage condition while the tape is moving. Patent No. 2,919,076 to Buslik and Vinson provides a tape transport using an off-on servo system with prepositioned upper and lower vacuum switches to control the upper and lower positions of a tape loop in a vacuum column.

However, in this invention, electrical signals are not switched into the servo system as a function of capstan direction to indicate wthether the loop is to be positioned at a high or low position, while moving, or at a center position during rest while at the same time using a proportionally-controlled servo system.

The present invention eliminates the need for these prior, or any other, capstan-signal switching arrangements by not utilizing a zero error-voltage condition when the tape is moving in forward or reverse directions.

Instead, the present invention in fact uses a non-zero error signal to automatically obtain and maintain a required dynamic loop position. Furthermore, the non-zero error signal has two selectable polarities or phases, wherein only a single stable polarity or phase, is automatically selected within the invention to position a loop at the required one of a high or low position.

The present invention also automatically sets up the servo system so that when the tape is not moving, its static loop is at a central position in the vacuum column. However, as soon as the capstan begins moving tape either into or out of the vacuum column, the inherent shift in the position of the tape loop is in the direction required for the next dynamic loop position. Simultaneously an error signal begins building-up with the required polarity (or phase) to automatically position the dynamic loop at the required upper or lower position. No logic is needed to choose any particular reference signal as a function of tape direction or is any means needed to switch any capstan signal into the servo system.

It is therefore an object of this invention to provide a tape-loop positioning servo system which utilizes inherent information in developing a non-zero type error signal to automatically select the required loop position in a vacuum column as a function of tape direction.

It is also an object of this invention to provide a tape loop positioning system which inherently positions a dynamic tape loop to an optimum position, and which does not require any electrical signals to be switched into the servo system to tell it which tape loop position to select.

It is a further object of this invention to provide a tape loop positioning system which utilizes the direction of mechanical motion of tape into or out of a buffer loop of moving tape to automatically control the length of the loop so that the range of buffer loop lengths needed over all operating conditions is minimized.

It is another object of this invention to provide a tape-loop servo system which is simpler in its basic circuitry than is any prior plural loop positioning system.

The invention uses proportional sensing of tape loop position to provide a sensed signal. After suitable amplification, where necessary, an error signal is generated by subtracting the sensed signal from a preset reference signal, which represents a median length for the loop when the tape is not moving, such as at the center of a vacuum column. Furthermore, either the sensed signal or the error signal is either gain adjusted or attenuation adjusted to control the overall servo gain. The servo gain and reference signal adjustments are made prior to use of the tape transport system, such as during manufacture. No further adjustment is needed in the absence of equipment breakdown. The preadjustment of servo gain automatically controls the high and low dynamic loop positions as a function of direction of tape motion.

The foregoing and other objects, features and advantages of the invention will be apparent from the following more particular description of preferred embodiments of the invention, as illustrated in the accompanying drawings.

FIGURES 5(A) and (B) illustrate the output response of lead networks used in the invention.

FIGURES 6(A) and (B) show the dampening responses for a dynamic tape loop reaching a steady-state position under full and empty reel conditions.

Figures 1, 2:
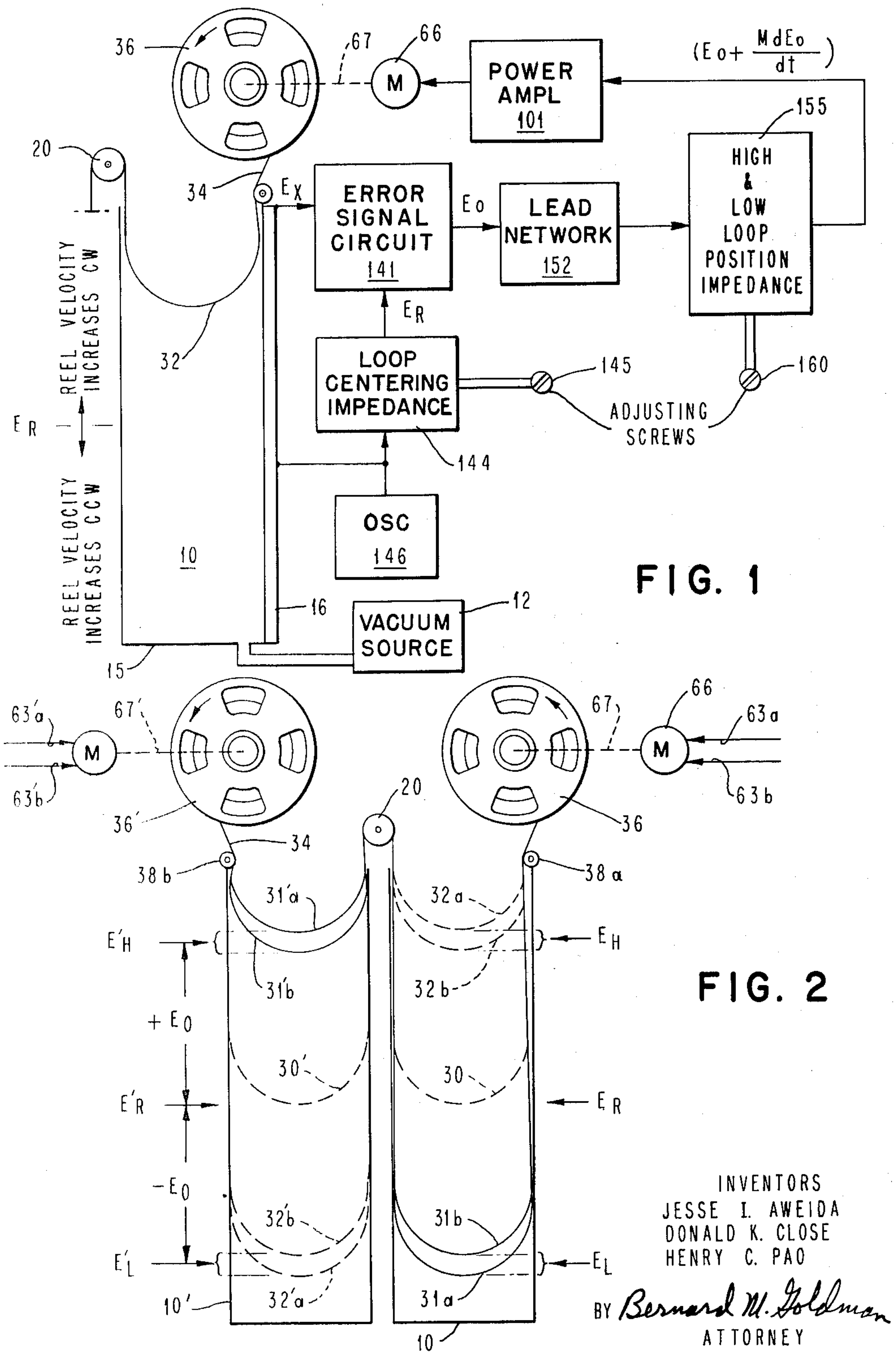
FIGURE 1 illustrates a basic servo configuration of the invention.
FIGURE 2 shows tape-loop position relationship to direction of tape motion and relationship to error signal and reference signal conditions in the invention.

FIGURE 1 illustrates a general embodiment of the invention. It shows a single reel 36, of which there are two, on a tape transport, such as shown in FIGURE 2. The tape 34 is wound on or off reel 36 into a vacuum column 10 to form a loop 32 across the column. The other side of the loop leaves the column and passes over a capstan 20, after which it drops into the other column. A vacuum source 12 connects to the bottom of column 10 to provide a vacuum in the column between tape loop 32 and the bottom 15 of the column.

A tape-loop position sensor 16 is provided vertically along the column. Sensor 16 provides an output voltage $E_X$ which has an amplitude proportional to the position of tape loop 32 in the column. Sensor 16 may be a proportional light source sensor, such as the type illustrated in Few Patent No. 2,487,755 which can provide an output signal proportional to the position of a tape-loop in a column; or sensor 16 may be a vacuum-controlled capacitive sensing unit, such as described in Hughes U.S. application Serial No. 706,184, filed December 30, 1957, and assigned to the same assignee as the present application.

An oscillator 146 is provided in the case where sensor 16 is a capacitive sensing device, which is assumed in this embodiment. An output for oscillator 146 is connected to sensor 16.

Frequency drift by oscillator 146 however has no effect on the system and need not be controlled. The reference-signal output of oscillator 146 is passed through a loop-centering impedance adjustment 144 that adjusts reference-signal amplitude before it is provided as a reference signal input of an error signal circuit 141. The alternating-voltage input of circuit 141 derived from impedance 144 is designated $E_R$. Impedance 144 would ordinarily be a potentiometer or rheostat adjusted by a screw 145. Circuit 141 receives the alternating-voltage sensor output $E_X$ as its other input. Error signal circuit 141 basically is a subtraction circuit. It subtracts the amplitudes of the sensor voltage $E_X$ and the reference voltage $E_R$ to provide an output voltage $E_O$.

The input alternating-voltages $E_X$ and $E_R$ may be converted to direct voltages prior to subtraction within circuit 141 so that a resulting direct-voltage $E_O$ switches polarity with respect to voltage $E_R$ when the loop position moves above or below the center of the column. On the other hand, $E_X$ and $E_R$ may be subtracted as alternating voltages, within circuit 141, so that the phase of voltage $E_O$ shifts by 180° when the tape loop moves above or below the center of the column.

A lead network 152 receives voltage $E_O$ and provides an output which includes a component that is proportional to $E_O$ and another component which is proportional to the time derivative of $E_O$ and which is designated $dEo/dt$.

A second impedance adjustment 155 in the system receives the output of the lead network and controls the distance of the high and low loop positions from a static center position for the loop at the center of the column. Impedance adjustment 155 controls the gain of the servo loop; and it can either attentuate or add gain to the signal from the lead network. Adjustment 155 can also be controlled by a screw 160 and may be a potentiometer or rheostat.

A power amplifier 101 receives the output of impedance adjustment 155 and drives a reel motor, which for example, may be a D.C. motor that turns clockwise in response to one polarity of voltage from amplifier 161, relative to reference $E_R$, and turns counter-clockwise in response to the opposite polarity of voltage from amplifier 161. The output of motor 66 is coupled by a shaft 67 (although a transmission unit may intervene) to a tape reel 36 to rotate it.

FIGURE 2 illustrates a pair of reels 36 and 36′ operating with a pair of vacuum columns 10 and 10′, which may be provided on a digital tape transport. Tape 34 passes over an idler **38*a* into and out of column 10, over a capstan 20, and into column 10′. Tape 34 then passes out of column 10′ over another idler 38*b* onto reel 36′. The capstan 20 is capable of very quickly starting tape movement in either direction of rotation. Also, capstan 20 is capable of stopping very quickly to brake the tape. When the tape is moving at constant velocity in the direction indicated by the arrows on the reels in FIGURE 2, the tape loops in the respective columns will be provided within a range of positions between the limits 31*a* and 31*b* in column 10, and between 31′*a* and 31′*b* in column 10′. The range of positions between 31*a* and 31*b*** is due to the variation in reel velocity and momentum between the reel conditions of having almost no tape and being almost full of tape. When a reel is almost empty, it is rotating at a high speed; and when the reel is almost full, it is rotating at a relatively low speed, and the start-stop times for the reels will vary between these conditions.

When the tape is traveling at constant velocity in the reverse direction, the tape loops are positioned in the ranges between **32*a* and 32*b* and 32′*a* and 32′*b***.

However, when the tape reels are not moving, the tape loops automatically revert to the central positions 30 and 30′ in the respective columns.

FIGURES 5A and B illustrate the response of lead network 152 in FIGURE 1. FIGURE 5B illustrates a step function 77 as an input $E_O$ to lead network 152. FIGURE 5A illustrates the resultant output from the network 152. Lead network is adjusted so that the peak of its transient output response is about 10 times the value of $E_O$ prior to a downward step to a value about one-tenth its former value.

Thus, in FIGURE 5A the transient output starts at value $E_O$ represented by line 76, and after the pulse response returns to the low order value of $E_O$ 10.

With this response of network 152, a desired damping characteristic is obtained for the loop when it moves suddenly from one position to another. Critical damping for the loop is however only obtained when the reel is about one-half full of tape. Overdamping of loop positioning is obtained when little tape is on reel, and underdamping is obtained when the reel is almost full of tape. The extreme and critical damping responses are illustrated in FIGURES 6A and B. In FIGURE 6A, curve 72 illustrates a critically damped movement of the loop position when it is moved to the low loop position. The loop movement begins at a prior time at a high loop position and is approaching the low loop position at time 70 and ends at time 71. However, when there is very little tape on a reel, its response will be overdamped as indicated by curve 73 in FIGURE 6A. On the other hand, when the tape reel is substantially full of tape, the tape loop will overshoot its required position somewhat as shown in FIGURE 6B and therefore it will be underdamped. It is noted in FIGURES 6A and B that the extreme overdamped and the underdamped conditions reach a steady-state level during approximately equal intervals of time, and that a lesser time is needed for damping all other reel conditions.

By choosing the equal-time extreme relationships illustrated in FIGURES 6A and B, the size of a reel motor is minimized, and maximum energy efficiency is obtained for motor operation.

In FIGURE 2 the position **31*a* and 32*a* is obtained when a respective tape reel is very nearly empty. On the other hand, the position 32*b* or 31*b*** is obtained when the respective tape reel is very nearly full. Accordingly, it is noted that as a tape reel continues to increase its number of windings, its associated loop position tends to ride closer to the center of the column. Furthermore, it is recalled from FIGURES 6A and B that as the tape reel increases beyond half full, it operates with an oscillatory underdamped characteristic.

Accordingly, by arranging the lead network response as discussed above to provide the stated under and overdamped respective conditions, it is found the increase in outward swing of the tape loop from its steady-state position is compensated by the steady-state position simultaneously being drawn closer to the center of the column. Accordingly, a maximum overshoot can be obtained that is no greater than the steady-state positions **31*a* and 32*a* which are closest to the ends of column 10. The attractiveness of this feature is realized when it is seen that overdamping occurs when the loop is near the ends of column 10** so that it cannot go out of the column and break, or touch the bottom of the column where it might be contaminated with dust. Consequently, the range of loop locations at an upper or lower position in the column automatically works hand in hand with the variation in damping response.

Figures 3, 4, 5, 6:
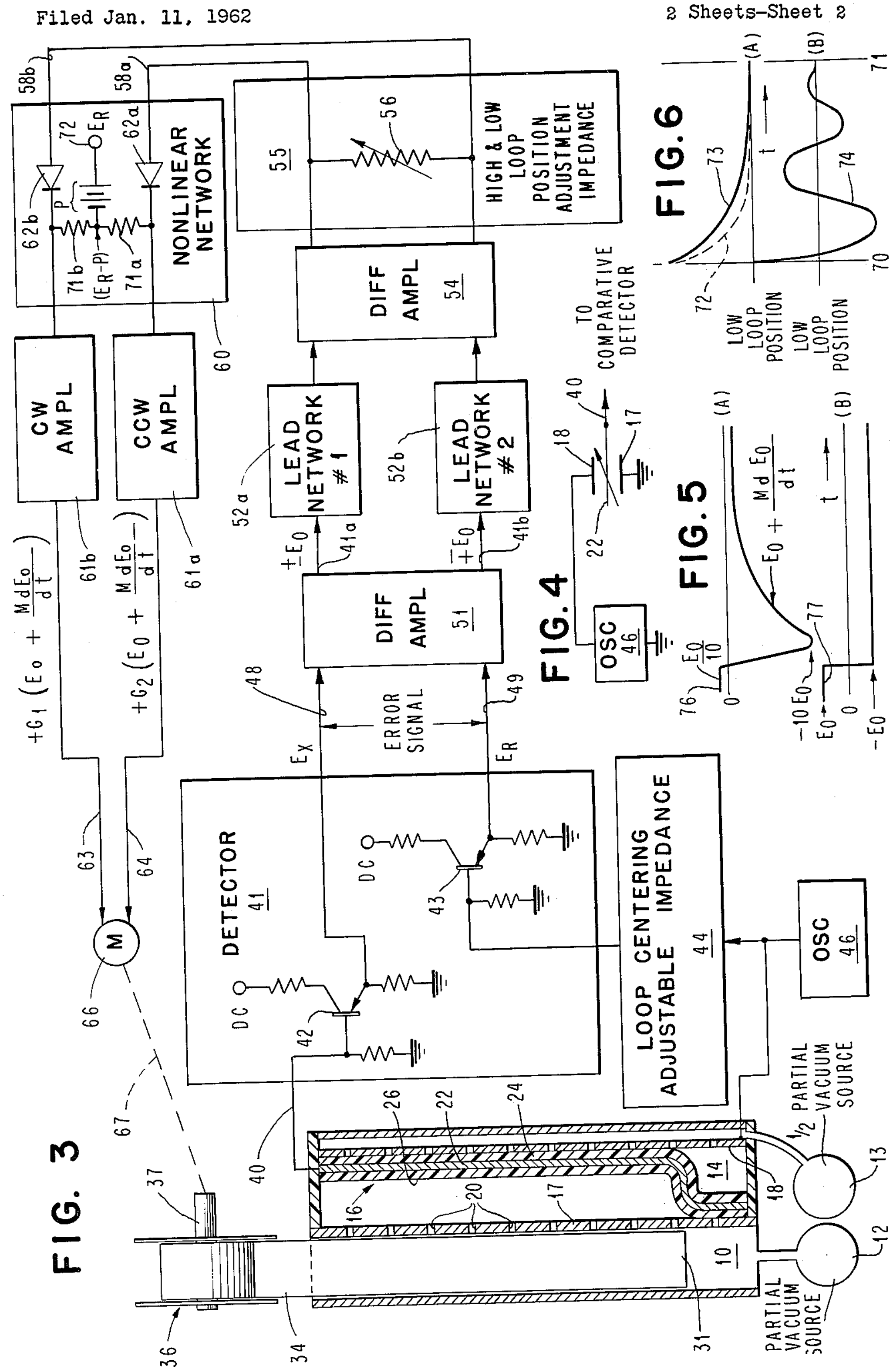
FIGURE 3 shows a more detailed form of an embodiment of the invention.
FIGURE 4 represents an analogy of the capacitive sensing in FIGURE 2.

FIGURE 3 illustrates a more detailed embodiment of the invention utilizing a capacitive sensor 16. In this case, the capacitive sensor is located behind each column. Thus, a side view of column 10 is shown in FIGURE 3 wherein the bottom of tape loop 31 is visible in the cross-section. Capacitive sensor 16 comprises a chamber which has substantially the same width and height as the column but has less depth. The chamber includes a flexible metallic sheet member 22 covered on both sides by plastic sheets 24 and 26 which are movable within chamber 16 and in effect divide it into two parts. The part of the chamber 16 adjacent the vacuum column has its air pressures communicated to the vacuum column through a plurality of openings 20 which extend throughout the vertical length of the column in the common-wall 17 between column 10 and sensor 16. The opposite part of chamber 16 is connected to half partial vacuum source 13 which provides a vacuum approximately midway between atmospheric pressure and the pressure of source 12. The back-wall 18 of chamber 16 is metallic and is insulated from the common wall by top and bottom members of the chamber. Plastic sheets 23 and 24 on conductive member 22 are insulating and may be Mylar sheets, so that conductive member 22 cannot make electrical contact with either wall 17 or 18.

In operation, it will be noted that below the tape loop 31, the vacuum of source 12 is provided; but above tape loop 31, atmospheric pressure is provided since the vacuum is cut off by the loop across the column. Consequently, below the tape loop, the vacuum within the column communicates through common holes 20 to the adjacent part of chamber 16 and sucks the portion of flexible member 26 below loop 31 against common wall 17. However, the portion of member 26 above the loop is pushed away from common wall 17 due to the atmospheric pressure being communicated through the openings 20 in the common wall above the loop. The half vacuum within the back part of chamber 14 sucks the upper part of the flexible member against wall 18. Thus, a bend occurs in flexible members 22, 24 and 26 at the approximate position of the tape loop.

The electrical relationship within the capacitive sensing means 16 in FIGURE 3 are illustrated in FIGURE 4, wherein it is noted that oscillator 46 provides an output to wall 18. On the other hand, the common wall 17 is connected to ground along with the remainder of the vacuum column. However, the flexible conducting member 22 therebetween is represented by the variable middle plate 22 in FIGURE 4. In FIGURE 3 an output lead 40 is provided from the middle plate of capacitor sensor 16 to provide its output; and likewise in FIGURE 4 lead 40 is shown.

The servo arrangement in FIGURE 3 is basically similar to the servo arrangement in FIGURE 1. However, in FIGURE 3 a differential amplifier system is utilized to obtain more stability for direct-current servo operation with respect to temperature and power supply variations.

Thus, in FIGURE 3 a detector 41 receives the alternating output voltage $E_X$ on lead 40 and the alternating reference output $E_R$ from impedance 44 and merely reduces them to proportional direct-voltages. A pair of transistors 42 and 43 detect alternating voltages $E_X$ and $E_R$ to convert them to direct voltages. Hence, transistor detector 42 has an output lead 48 with a direct-voltage $E_X$, and transistor 43 provides output lead 49 with direct-reference voltage $E_R$. The servo system could instead handle the voltages in alternating current form without D.C. detection, but it was found expedient in practice to utilize a direct-current motor 66 and to handle the servo signals in direct-current form.

Differential amplifier 51 receives voltages $E_X$ and $E_R$ and subtracts voltage $E_R$ from voltage $E_X$, and vice-versa, to provide the two output voltages on leads 41*a* and *b* which swing in opposite directions, with respect to the D.C. reference level of reference $E_R$. Accordingly, the two voltages $\pm E_O$ and $\mp E_O$ are provided to respective lead networks 52*a* and *b* which are basically the same as lead network 152 in FIGURE 1.

The outputs of the two lead networks are respectively provided as inputs to another differential amplifier 54 which may be basically the same as differential amplifier 51.

A circuit which may be used for each differential amplifier 51 or 54 is described in the March 1956 issue of the IRE Transactions on Circuit Theory on pages 51–53 in an article entitled, "The Emitter-Coupled Differential Amplifier," by B. W. Slaughter, FIGURE 1. The blocking capacitors on the input and output lines of the article should obviously be removed for direct-current operation.

Amplifier 54 provides amplification for the lead network outputs and also assists in impedance matching the outputs of the lead networks. The outputs of differential amplifier 54 are provided to a high and low loop-position impedance 55, which merely comprises a rheostat connected between the two output terminals of amplifier 54. Accordingly, rheostat 56 can be adjusted to control the effective servo gains of the two outputs of amplifier 54. The rheostat in effect allows opposite-polarity current from the other differential output to partly cancel the current in a given differential output 58*a* or *b*. Thus the gain control by rheostat 56 is equalized with respect to the two differential amplifier outputs.

The two outputs from impedance 55 are connected by lines 58*a* and 58*b* to a nonlinear network 60 that comprises a pair of diodes 62*a* and *b*.

The nonlinear network 60 maintains a small current of equal magnitude and opposite polarity through opposite direction inputs of motor 66 when the motor is not rotating to maintain the static loop at the center of the column. This increases the speed of response of motor 66 when the loop position moves from the center of the column. Thus a small potential P is used to reduce the value of $E_R$ applied to network 60. Network 60 permits only the more positive of the differential output signals on leads 58*a* or *b* to drive a corresponding amplifier 61*a* or *b*. That is, if the signal on lead 58*a* has the greater positive magnitude, counter-clockwise amplifier 61*a* actuates motor 66 in a counter-clockwise direction. On the other hand, if the signal on lead 58*b* has the greater positive magnitude, then clockwise amplifier 61*b* actuates motor 66 in a clockwise direction. Reel 36 rotates in the corresponding direction of motor 66.

Nonlinear network 60 is arranged so that one of the diodes is biased to non-conduction as long as the signal on its lead 58*a* or *b* is below the voltage level $E_R$–P, and the other diode is then biased to conduct the opposite signal. Hence a terminal 72 is connected to a biasing source, such as lead 49 to receive the reference potential. Isolating resistors 71*a* and *b* are connected between terminal 72 and respective cathodes of diodes 62*a* and *b*. Since the voltages on leads 58*a* and *b* vary oppositely about $E_R$ when the system is operating with the loop of an upper or lower position, one must always be above $E_R$ while the other is below $E_R$. Thus, only the diode which receives a voltage above $E_R$–P will conduct.

The gain value for the error signal is controlled by the high and low adjustment impedance 56 which controls the amplitude of the error signal $E_O$ directly. The same result could also be done by controlling the amplitude of the sensed signal $E_X$, since in the latter case, the value of $E_O$ is dependent on the value of $E_X$.

Similarly, the lead network is likewise effective if connected in series with signal $E_X$ instead of $E_O$. When it operates on $E_O$ it is in effect operating on $E_X$ since $E_O$ is in effect $E_X$ with a changed amplitude level. With respect to transients, $E_O$ and $E_X$ are basically the same.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An automatic loop-positioning servo system not receiving any electrical capstan-control signal, comprising means for receiving a tape loop, motor means for driving a reel in either direction or stopping it in response to said servo system, a capstan arrangement having means for quickly stopping or starting tape motion in either direction on the opposite side of said loop from said tape reel, means for sensing the position of the tape loop in said receiving means and providing an amplitude-varying sensing signal dependent on loop position, means providing a reference signal, a first gain-control means for said reference signal fixed during operation of said servo system to control a static center-loop position for said loop, means for adjusting said first gain-control means to a fixed value prior to normal operation of said servo system, an error-signal generator receiving said sensing signal and said reference signal to provide at least one error-signal output for said motor means, at least one lead network serially connected in a path with said sensing signal to generate a time derivative of it, said lead network providing a derivative signal with an overdamped characteristic when said tape reel is nearly empty and with an underdamped characteristic when said tape reel is nearly full, a second gain-control means in the serial path of said error signal to control high and low dynamic loop positions relative to said static center position, and second means for adjusting said second gain-control means to a fixed value prior to normal operation of said servo system, whereby said second gain-control means determines the distances of said upper and lower dynamic loop positions from said static center loop position.

2. An automatic loop-positioning servo system as defined in claim 1 in which said lead network provides critical damping when said reel of tape is approximately half full of tape.

References Cited by the Examiner

UNITED STATES PATENTS 2,952,415 9/1960 Gilson ------------ 242—55.12

MERVIN STEIN, *Primary Examiner.*

H. R. MOSELY, G. F. MAUTZ, *Assistant Examiners.*